United States Patent
Wu et al.

(10) Patent No.: US 8,332,608 B2
(45) Date of Patent: Dec. 11, 2012

(54) METHOD OF ENHANCING COMMAND EXECUTING PERFORMANCE OF DISC DRIVE

(75) Inventors: Ching-Yi Wu, Hsinchu (TW); Pao-Ching Tseng, Hsinchu (TW); Jih-Liang Juang, Yi-Lan Hsien (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 966 days.

(21) Appl. No.: 12/233,603

(22) Filed: Sep. 19, 2008

(65) Prior Publication Data

US 2010/0077175 A1    Mar. 25, 2010

(51) Int. Cl.
 *G06F 12/00* (2006.01)
(52) U.S. Cl. .................. 711/169; 711/E12.001; 710/310
(58) Field of Classification Search .................. 711/113, 711/111, 103, E12.001, 169, 167; 710/1, 710/310; 708/101
See application file for complete search history.

(56) References Cited

U.S. PATENT DOCUMENTS

| | | | |
|---|---|---|---|
| 5,867,163 A * | 2/1999 | Kurtenbach | 715/840 |
| 6,571,298 B1 * | 5/2003 | Megiddo | 711/111 |
| 6,574,676 B1 * | 6/2003 | Megiddo | 711/111 |
| 6,763,427 B1 | 7/2004 | Doi | |
| 6,898,665 B1 * | 5/2005 | Megiddo | 711/113 |
| 7,181,561 B2 * | 2/2007 | Barth et al. | 710/310 |
| 2004/0215837 A1 * | 10/2004 | Abbey et al. | 710/1 |
| 2008/0059971 A1 * | 3/2008 | Abbey et al. | 718/104 |
| 2009/0079763 A1 * | 3/2009 | Takeichi | 345/630 |
| 2009/0172264 A1 * | 7/2009 | Chung et al. | 711/103 |
| 2009/0199187 A1 * | 8/2009 | Cervantes et al. | 718/101 |

FOREIGN PATENT DOCUMENTS

| EP | 0 781 432 B1 | 12/2006 |
|---|---|---|
| TW | 200836180 | 9/2008 |

* cited by examiner

*Primary Examiner* — Pierre-Michel Bataille
(74) *Attorney, Agent, or Firm* — Winston Hsu; Scott Margo

(57) ABSTRACT

For decreasing seeks generated when switching an execution flow between commands to enhance read and write performances of a disc drive, a command is implemented with a specifically-designed data structure, and commands having neighboring physical addresses and the same type of read or write operations are grouped and linked together. With the aid of command groups, seeks between commands are significantly decreased, though starvation may arise. A few techniques are further provided for preventing starvation of command groups and for preserving the benefits of decreasing seeks.

21 Claims, 12 Drawing Sheets

| Command | CMD_ID | Read/Write | LBA | LEN | Priority | *Next_CMD |
|---|---|---|---|---|---|---|

FIG. 4

METHOD OF ENHANCING COMMAND EXECUTING PERFORMANCE OF DISC DRIVE

BACKGROUND OF THE INVENTION

1. Field of the Invention

The present invention relates to a method of enhancing command executing performance of a disc drive, and more particularly, to a method of enhancing read and write performances of a disc drive by utilizing a linked list called a command group for efficiently integrating a plurality of commands together, and by relieving starvation of the plurality of commands with the aid of the command group.

2. Description of the Prior Art

Please refer to FIG. 1, which is a related art diagram illustrating the distribution of a plurality of commands executing by a disc drive to a disc 102. As illustrated in FIG. 1, there is a plurality of commands that will be executed on three different areas 104, 106, and 108 of the disc 102, where the commands A0, A1, A2, A3, A4, and A5 are executed on the first area 104, the commands V0, V1, and V2 are executed on the second area 106, and the commands S0, S1, S2, and S3 are executed on the third area 108. The command sequence (A0, V0, V1, V2, A1, A2, S0, S1, A3, A4, A5, S2, S3) for indicating the order of executing the commands on the disc is also shown in FIG. 1. When executing two consecutive commands in different area, a seeking process is needed for seeking the starting address for executing the following commands. According to the command sequence illustrated on FIG. 1, six seeking processes are required when executing said command sequence, where a first seek is for seeking the beginning address for executing command A0 at the beginning, a second seek is generated between the executions of the commands A0 and V0, a third seek is generated between the executions of the commands V2 and A1, a fourth seek is generated between the executions of the commands A2 and S0, a fifth seek is generated between the executions of the commands S1 and A3, and a sixth seek is generated between the executions of the commands A5 and S2.

However, involving more seeking process when executing the command sequence increases time consumption.

In summary, for read and write commands on a disc and in a command sequence, switched execution between read and write commands lead to a large amount of seeks, and further lead to a large time consumption of the disc drive in accessing the disc.

SUMMARY OF THE INVENTION

The present application provides a method of enhancing command execution performance of a disc drive. A plurality of commands is collected. Then the plurality of commands are allocated into at least one command group and the at least one command group is queued. A command executing sequence of the commands in each command group is arranged. A command group from the queued at least one command group is selected, and the commands in the selected command group are executed according to the command execution sequence of the selected command group.

It is yet another embodiment of the application to disclose allocating the plurality of commands according to a command type and/or a logical block address of each command.

It is yet another embodiment of the application to disclose allocating the commands having the same command type together into one of the command groups.

It is yet another embodiment of the application to disclose allocating the commands having physical block addresses within a predetermined distance of each other into one of the command groups.

It is yet another embodiment of the application to disclose selecting the command group having a starting physical block address closest to where a pickup head of the disc drive is located on a loaded disc of disc drive.

It is yet another embodiment of the application to disclose selecting the command group having a starting physical block address most inner of a loaded disc in the disc drive.

It is yet another embodiment of the application to disclose selecting the command group having a largest amount of commands.

It is yet another embodiment of the application to disclose selecting a group according to the type of commands in the command group.

It is yet another embodiment of the application to disclose the received commands are stored within a data structure, the data structure comprising a command identity of the command, a flag for indicating the command type of a command, a logical block address for indicating a starting physical block address for executing the command, an execution length of the command, a priority of the command, and a next pointer for addressing a next command.

It is yet another embodiment of the application to disclose generating a header for each of the plurality of queued command groups, generating a head pointer for each of the generated headers to address the first command of a corresponding command group, generating a tail pointer for each of the generated headers to address the last command of a corresponding command group, assigning a priority for each command in a command group from the first command to the last command, and allocating a memory segment in a physical memory on the disc drive for each of the command groups as a buffer according to target physical addresses of commands in each of the command groups, the target physical addresses locating on the physical memory.

It is yet another embodiment of the application to disclose collecting a new command into one of the command groups.

It is yet another embodiment of the application to disclose checking whether any command group matching the new command exists, wherein a tail address of the last command of said matching command group plus a predetermined length reaches a physical block address of said new command, and a flag of said new command is consistent with the matching command group, and setting a next pointer of the last command of the matching command group to address the new command when the command group matching the new command exists, and setting a tail pointer of the matching command group to address the new command.

It is yet another embodiment of the application to disclose creating a command group for the new command when a matching command group of the new command does not exists, and setting both a head pointer and a tail pointer of a header of the created command group to address the new command.

It is yet another embodiment of the application to disclose providing a time counter to record an idle time of each of said generated plurality of command groups, and picking a command group having a longest idle time first.

It is yet another embodiment of the application to disclose picking a command group having a smallest execution time first.

It is yet another embodiment of the application to disclose checking whether an amount of commands in a currently-executing command group exceeds a first predetermined amount of commands after executing a second predetermined amount of commands of the currently-executing command group, and swapping the execution flow from the current-executed command group to another command group having a largest amount of commands among the plurality of command groups except for said currently-executed command group.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram of how the data structure of a command is implemented according to an embodiment of the present invention.

DETAILED DESCRIPTION

Therefore, a method of enhancing command executing performance of a disc drive is disclosed in embodiments of the present invention, for significantly decreasing the amount of seeks and corresponding time consumption.

Figure 1:
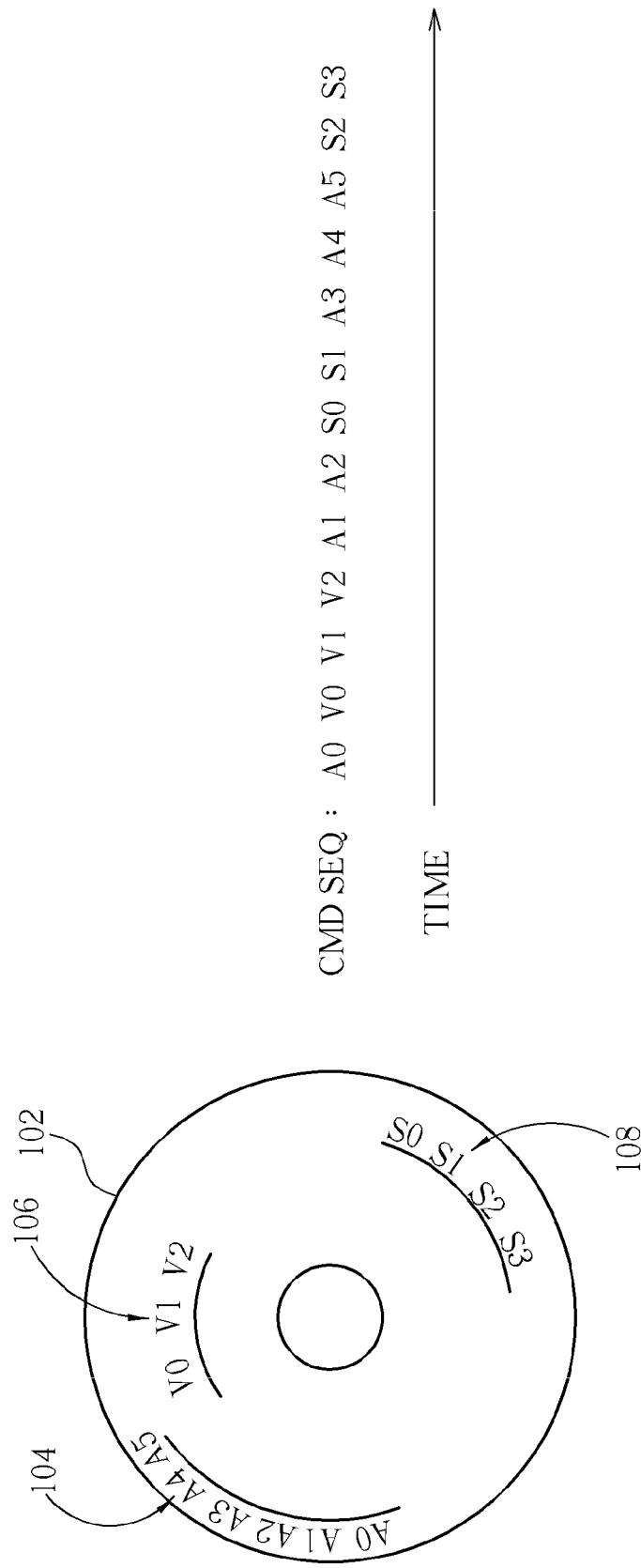
FIG. 1 is a related art diagram illustrating the distribution where a plurality of commands is executed by a disc drive on a disc.
Figure 2:
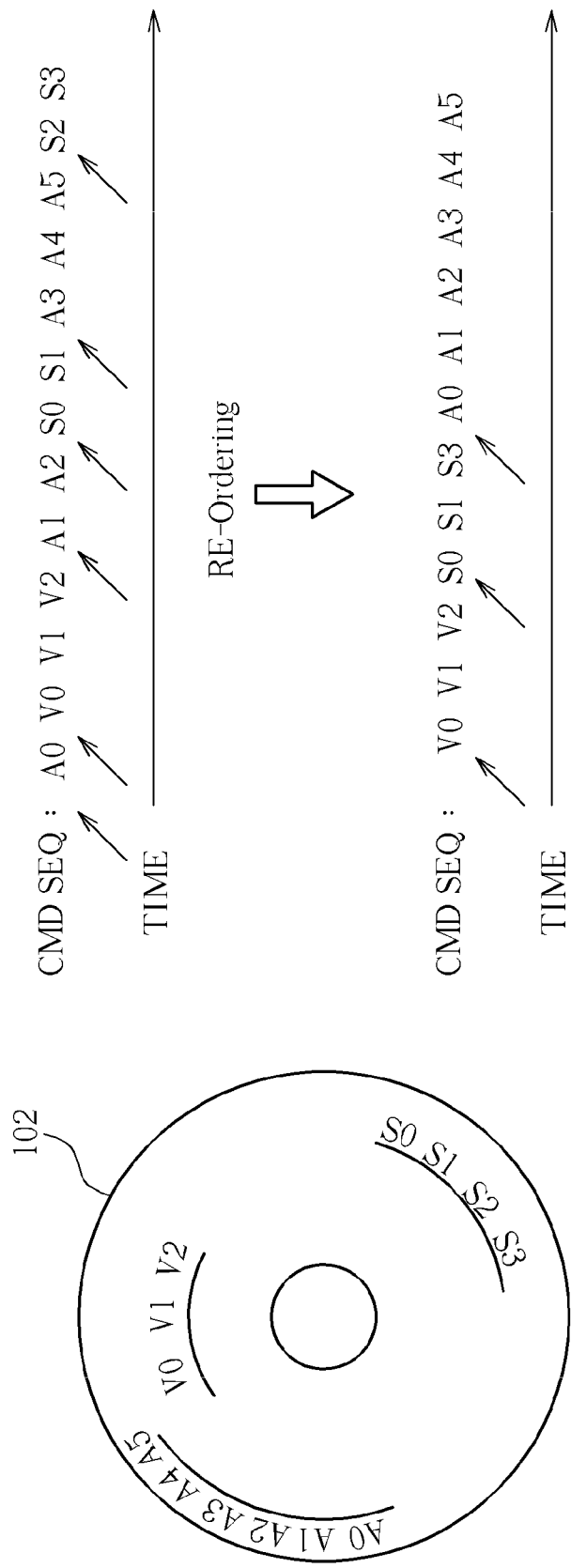
FIG. 2 is a schematic diagram decreasing the amount of seeks illustrated in FIG. 1 according to a preferred embodiment of the present invention.

Please refer to FIG. 2, which is a schematic diagram of decreasing the amount of seeks illustrated in FIG. 1 according to a preferred embodiment of the present invention. As shown in FIG. 2, commands belongs to a same track are grouped together in command sequence, and therefore, merely three seeks, other than six seeks in FIG. 1, are taken for completing the commands, where a first seek is for seeking the command V0, a second seek is generated between the commands V2 and S0, and a third seek is generated between the commands S3 and A0. Since the number of seeks may be decreased by grouping commands, the concept of executing the commands by group plays a critical part in embodiments of the present invention.

Figure 3:
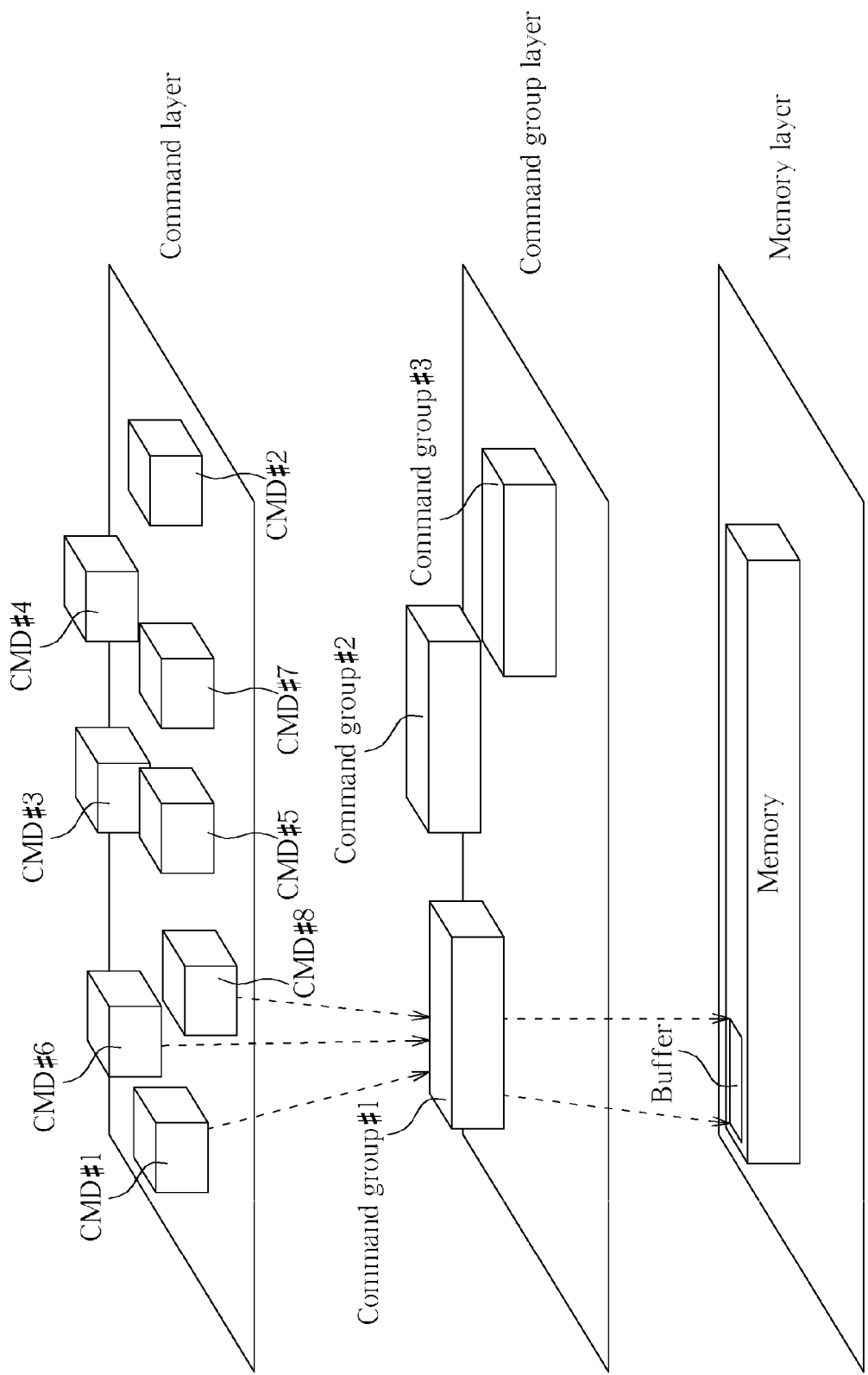
FIG. 3 is a schematic diagram illustrating how a command group works according to an embodiment of the present invention.

In the method of one embodiment, a data structure is provided for implementing a command, and for further implementing a group having commands as elements, where the group is called a command group in the method of the present invention. Please refer to FIG. 3, which is a schematic diagram illustrating how a command group works according to the method of the present invention. As can be observed in FIG. 3, a command layer having a plurality of commands, a command group layer having a plurality of command groups, and a memory layer having a memory are illustrated. The plurality of command groups is smaller than the plurality of commands. A command group includes a corresponding plurality of commands on the command layer, and refers to a memory block on the memory in a one-by-one and onto manner. Moreover, different command groups refer to different memory blocks on the memory, where a block of physical addresses on the memory is assigned to a command group having commands related to said block of physical addresses. However, there may be overlaps between the memory blocks since different command groups may operate on the same block of physical addresses on the memory.

Please refer to FIG. 4, which is a diagram of how the data structure of a command is implemented according to the embodiments of the present invention. As illustrated in FIG. 4, fields of the data structure include a command identity CMD_ID of the command, a flag for indicating the command type of the command, a logical block address LBA for indicating a starting physical block address for executing the command, an execution length LEN of the command, a priority of the command in comparison with other commands in the same command group, and a next pointer *NEXT_CMD for addressing a next command in the same command group. The flag is for indicating whether the command is a read command or a write command, and is preferably implemented as a Boolean value. During command execution, the logical block address is first transformed into a corresponding physical block address on the disc for indicating an address being read from or written to on the disc. Under most situations, a logical block address of a command is the same as a physical block address of the command except for some particular conditions including invalid tracks and track accessing errors caused by certain vibrations. Therefore, in the descriptions hereafter, a logical block address of a command is assumed to be the same with a physical block address of the command but is not limiting as such. When the flag of the command indicates that the command is a write command, a verify field is further added to the structure of the command for verifying a related write operation of said command and for ensuring write dependency in reading and writing data at the same physical address.

Figure 5:
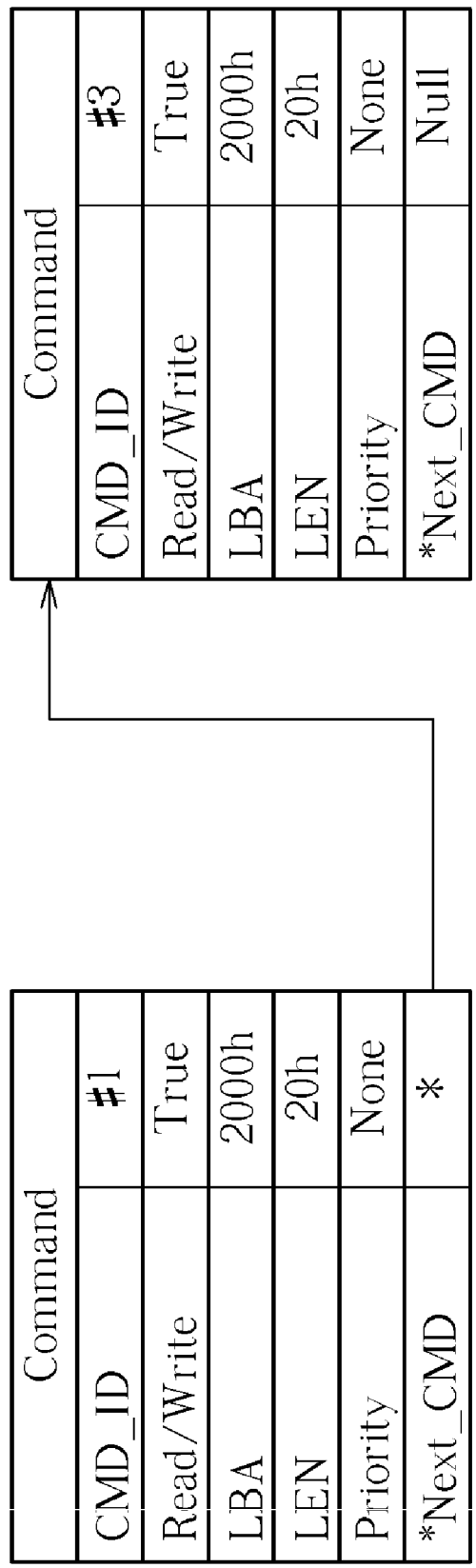
FIG. 5 is a diagram illustrating how member commands of a command group are grouped according to the data structure illustrated in FIG. 4.

Please refer to FIG. 5, which is a diagram of illustrating how member commands of a command group are grouped according to the data structure illustrated in FIG. 4. Member commands of a command group are grouped one by one according to a basic rule disclosed in the present invention, where how the basic rule works is illustrated in views of grouping the commands CMD#1 and CMD#3. According to FIG. 5, the basic rule is represented as:

If (PBA of CMD#1+LEN of CMD#1)+X=(PBA of CMD#3)

Then

CMD#1->CMD#3    (1)

PBA of CMD#1 indicates a physical block address of the command CMD#1. LEN of CMD#1 indicates execution length of the command CMD#1. PBA of CMD#3 indicates a physical block address of the command CMD#3, where said physical block address is assumed to be the same as a logical block address of the command CMD#3, i.e., LBA of CMD#3, according to the abovementioned assumption. X indicates a distance between the tail of the command CMD#1, i.e., the physical block address of the command CMD#L plus the length of the command CMD#1, and the physical block address of the command CMD#3, i.e. a starting address of the command CMD#3. Equation (1) works for both the commands CMD#1 and CMD#3 when the absolute distance X is shorter than a predetermined length, where the predetermined length is determined according to various requirements and specifications of optical discs. Since the logical block address/the physical block address of the command CMD#1, i.e., 2000 h, plus the length of the command CMD#1, i.e., 20 h, reaches the logical block address/the physical block address of the command CMD#3 with a distance equaling to 0h, both the commands CMD#1 and CMD#3 match the equation (1), and a next pointer *NEXT_CMD of the command CMD#1 is set to address the next command CMD#3. Note that even the equation (1) is satisfied for a first command and a second command, however, when the first command is a read command and the second command is a write command, or when the first command is a write command and the second command is a read command, said first command and said second command cannot be grouped together in the same command group since it is not beneficial to grouping commands of different types in the same command group.

By grouping commands matching the equation (1) and within a plurality of commands, a plurality of command groups is thus generated or formed. However, note that there may also be some command groups having a single command since there is no other command matching the equation (1) with the single command. Moreover, the formed plurality of command groups is basically classified into read command groups, each of which has read commands exclusively, and write command groups, each of which has write commands exclusively.

In addition to using or as an alternative to using the above described formula for allocating commands into command groups, some embodiments may practice other methods of allocating commands into command groups. For example, allocating the plurality of commands according to a command type and/or a logical block address of each command, allocating the commands having the same command type together into one of the command groups, and/or allocating the commands having physical block addresses within a predetermined distance of each other into one of the command groups. Regardless of the allocation method, the allocation itself and the rearrangement of the executing sequence of the commands within the command groups serve to enhance command executing performance of a disc drive as desired.

Figure 6:
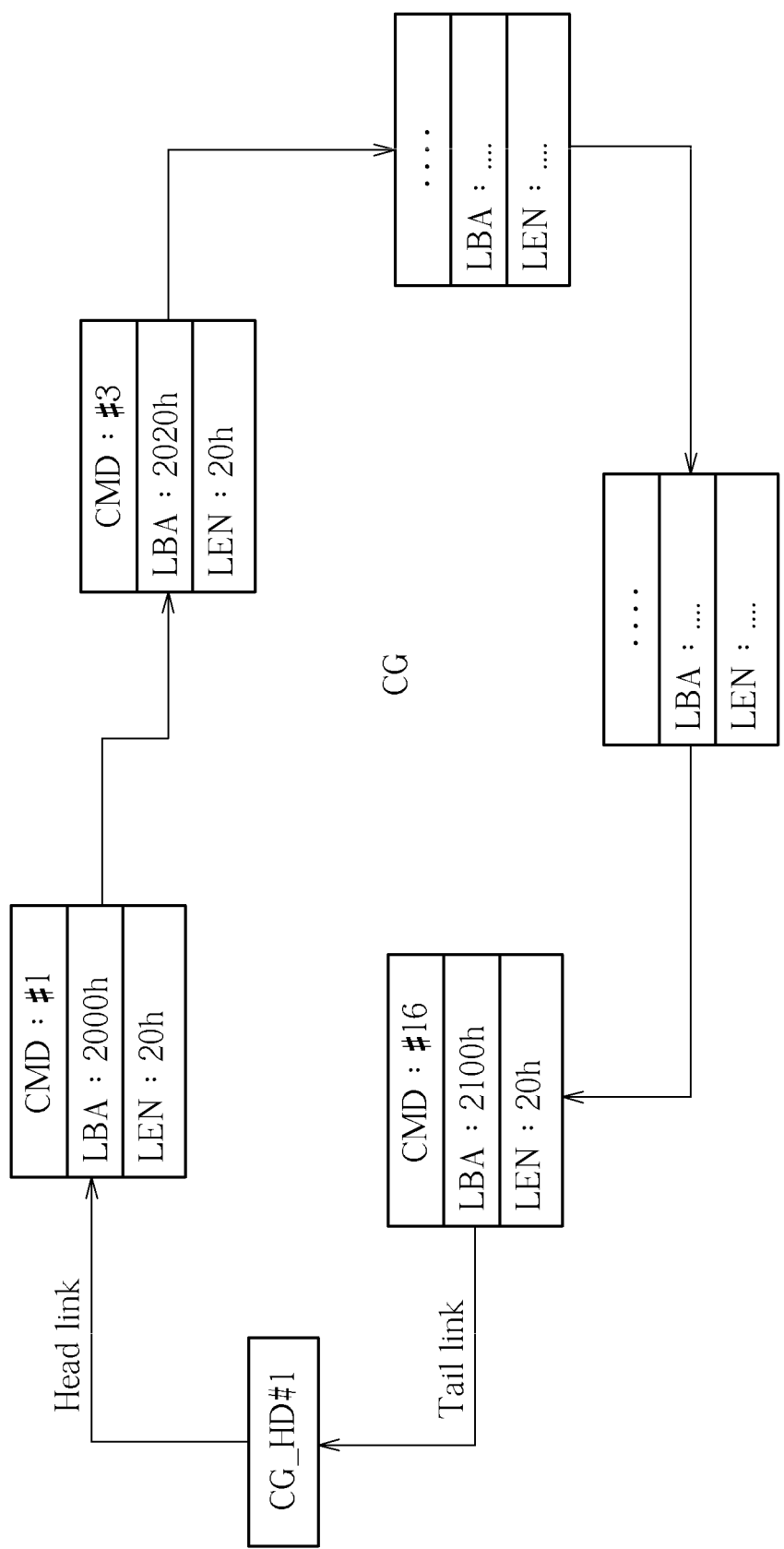
FIG. 6 is a diagram illustrating a command group generated with respect to diagrams illustrated in both FIG. 4 and FIG. 5 and a related execution sequence of said command group.

Please refer to FIG. 6, which is a diagram illustrating a command group generated with respect to diagrams illustrated in both FIG. 4 and FIG. 5, and a related execution sequence of said command group. As illustrated in FIG. 6, a header is generated for each of the plurality of queued command groups, a head pointer is generated for each of the generated headers to address the first command of a corresponding command group, a tail pointer is generated for each of the generated headers to address the last command of a corresponding command group, a priority for each command in a command group is assigned from the first command to the last command, and a memory segment in a physical memory on the disc drive is allocated for each of the command groups as a buffer according to target physical addresses of commands in each of the command groups, the target physical addresses locating on the physical memory. Note that a command group identity for the command group is required to be added in a header of said command group.

When the command group illustrated in FIG. 6 is to be executed, a header CG_HD#1 is first fetched for recognizing where member commands of the command group are and for executing the recognized member commands one by one by following next pointers of said member commands until the last command of said command group is found when a current pointer of the execution flow matches with the tail pointer of the header of said command group, indicating that all member commands of said command group have been found and executed.

According to a preferred embodiment of the present invention, the generated plurality of command groups may also be grouped and linked in a priority queue, which may also be denoted as a command group queue, for indicating a sequence of executing the generated plurality of command groups. Please refer to FIG. 7, which is a diagram of implementing a command group queue according to a preferred embodiment of the present invention. Members of the command group queue are headers of the generated plurality of command groups. Therefore, headers of the generated plurality of command groups are linked and grouped together for indicating an execution sequence of said generated plurality of command groups. According to the command group illustrated in FIG. 6, a next pointer is further required to be provided for each header to address a next command group to be executed among the generated plurality of command groups, and moreover, a current execution pointer is also provided for the command group queue to address a currently executing command group among the generated plurality of command groups.

The criterion of grouping headers of a plurality of command groups in a command group queue basically may follow the above-mentioned rule of FIG. 5, i.e., the principle of the equation (1). Therefore, a next pointer of a first header addresses a second header, where the first and the second headers respectively indicate different command groups, when a distance between disc location at a tail of the command group indicated by said first header and a starting disc location of the command group indicated by said second header should not exceed a predetermined length. Note that the tail of the command group indicated by the first header is a tail of a last command of said command group, i.e., a physical block address addressed by the tail pointer of said first header plus a length of said last command. The start of the command group indicated by the second header is also noted as a physical block address of a first command of said command group, which is addressed by a head pointer of said second header. Note that the predetermined length for grouping headers in the command group queue is not necessarily the same with the predetermined length for grouping commands in a command group as illustrated in FIG. 5, and the predetermined length for grouping headers in the command group queue may also be determined according to various environments or operating systems. The general idea is that while a seek will normally occur when changing from one group to another group, efficiency is maximized when the headers are arranged such that the distance covered by any group to group seeks is minimized. Note that the command group queue is just a specific embodiment of the present invention so that said command group queue is not described in the following descriptions except for particularly being mentioned.

Figure 8:
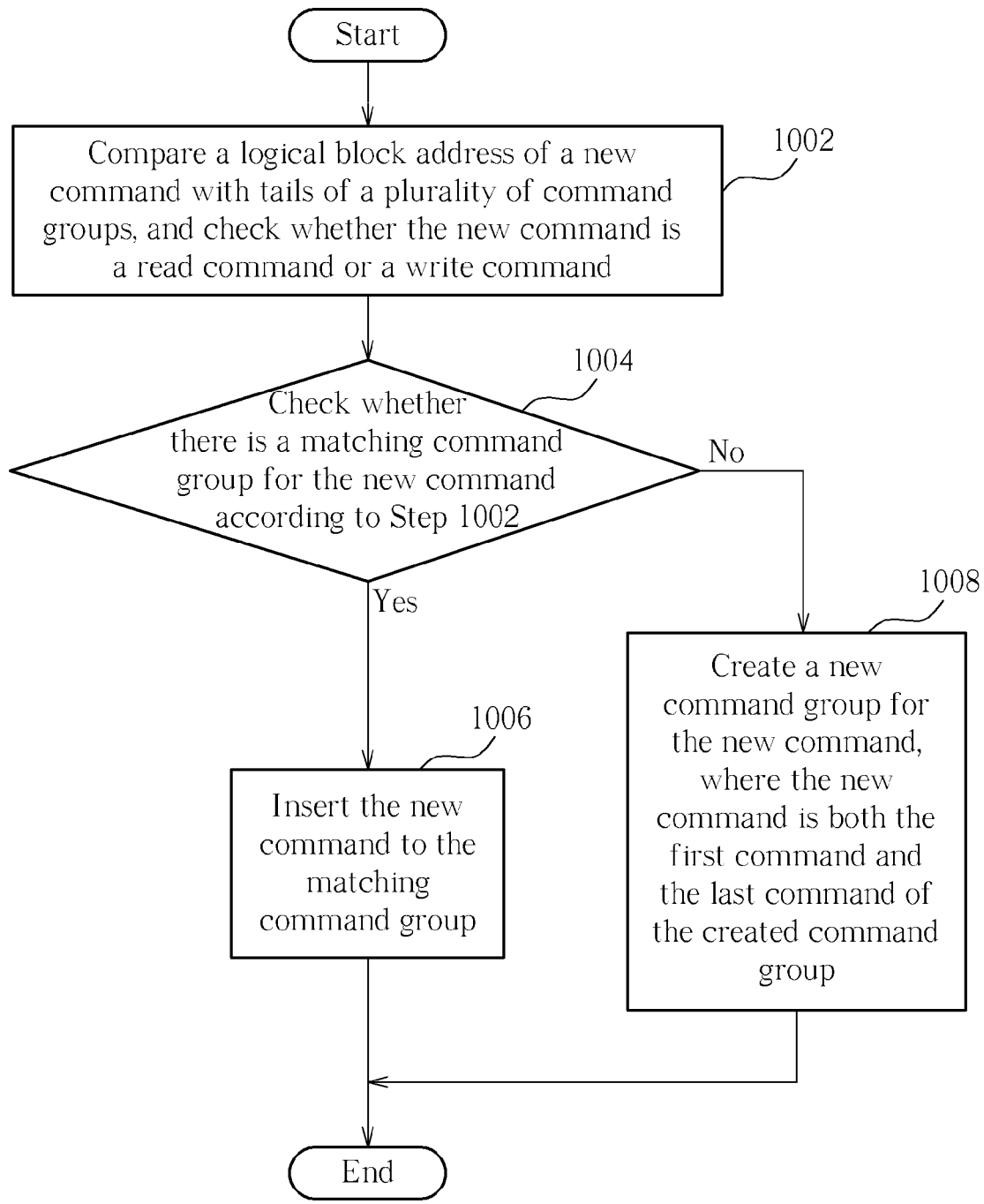
FIG. 8 is a flowchart of a command inserting method performed after a plurality of command groups has been formed for determining how a new command is inserted in one of the plurality of command groups according to a preferred embodiment of the present invention.

After the generated plurality of command groups is formed, additional commands are continuously loaded requiring determination of which command group respectively corresponds to each of the additional commands and the deposit of each of the additional commands into the corresponding group. Please refer to FIG. 8, which is a flowchart of a command inserting method performed after a plurality of command groups has been formed for determining how a new command is inserted in one of the plurality of command groups according to a preferred embodiment of the present invention. The command inserting method of the present invention includes the following steps:

Step 1002: Compare a logical block address of a new command with tails of a plurality of command groups, and check whether the new command is a read command or a write command.

Step 1004: Check whether there is a matching command group for the new command according to Step 1002. When there is a matching command group for the new command, go to Step 1006. Else, go to Step 1008.

Step 1006: Insert the new command into the matching command group.

Step 1008: Create a new command group for the new command, where the new command is both the first command and the last command of the created command group.

The aim of both the steps Step 1002 and Step 1004 is to search for an appropriate command group in which to insert a new command. Therefore, both the steps Step 1002 and Step 1004 basically follow the equation (1), and a distance between a tail of a last command of each existing command group and a logical block address of the new command is calculated. When there is a command group, whose last command has a tail within a predetermined length from the logical block address of said new command, Step 1006 is immediately performed to insert the new command to the matching command group. Note that both the steps Step 1002 and Step 1004 further follow a type of the new command, i.e., whether the new command is a read command or a write command. When the type of the new command matches with the type of the matching command group, the matching command is a matching command group with said new command, or else, the matching command group does not serve as a matching command group for said new command since inserting the new command to a command group having a different type with said new command is not beneficial for command execution. Concretely speaking, Step 1006 includes setting a next pointer of the last command of the matching command group to address the new command, and switching a tail pointer of the header of said matching command group to the address of the new command. When it comes to Step 1008, i.e., when there is not a matching command group for the new command, a new command group is established for the new command. Concretely speaking, Step 1008 includes generating a header for the new command group, setting a command group identity for the new command group, and setting both a head pointer and a tail pointer of the header to the address of the new command, and therefore, the new command is temporarily the unique command of the new command group until another matching command is inserted.

Figure 9:
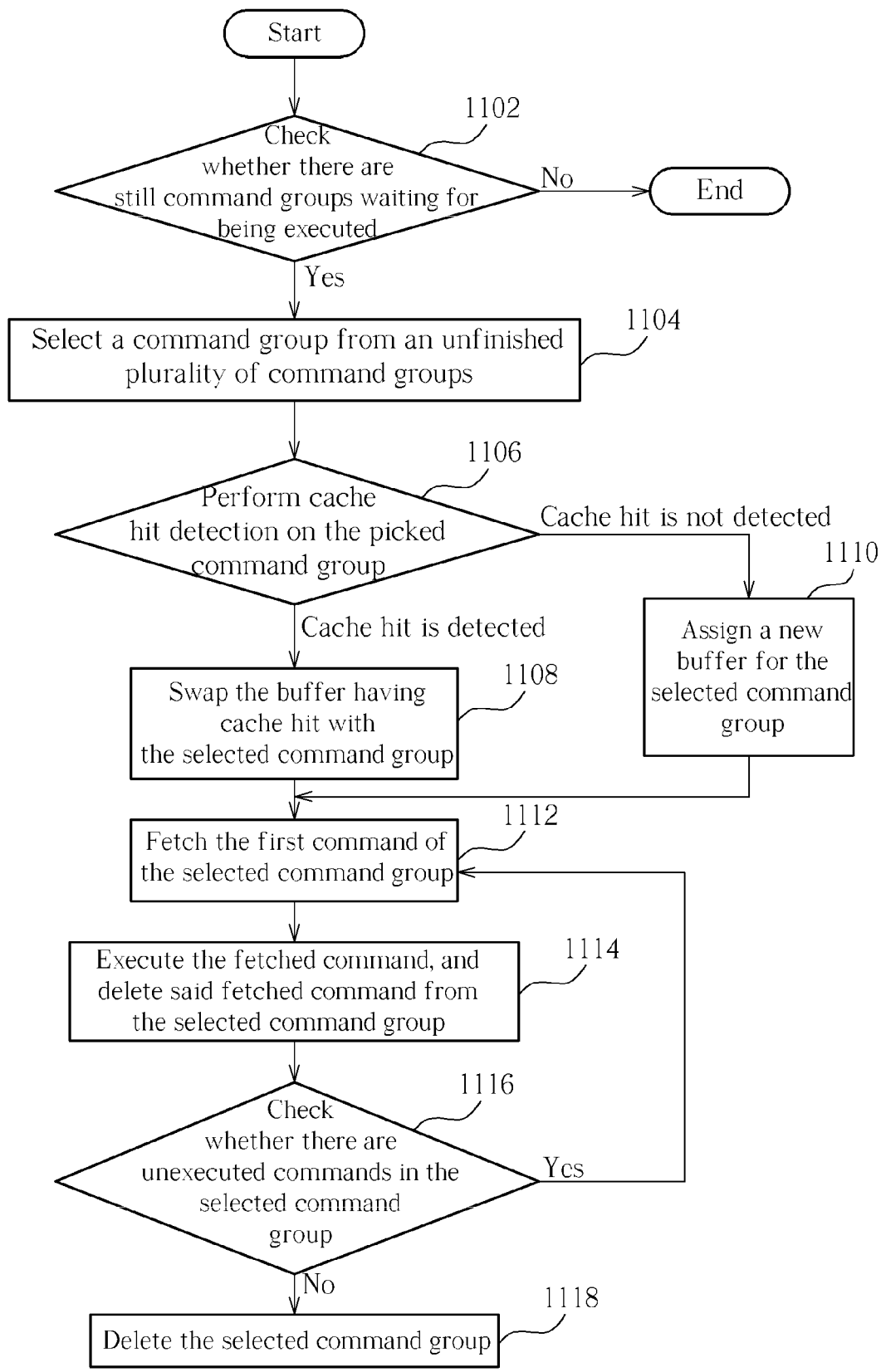
FIG. 9 is a flowchart illustrating the command execution flow for a plurality of command groups according to a preferred embodiment of the present invention.

Preferably, the command execution flow for commands works simultaneously with adding new commands, and the command execution flow for command groups in the present invention works in a similar manner. Please refer to FIG. 9, which is a flowchart of illustrating the command execution flow for a plurality of command groups according to a preferred embodiment of the present invention. Steps illustrated in FIG. 9 are listed as follows:

Step 1102: Check whether there are still command groups waiting to be executed. When there are still command groups waiting to be executed, go to Step 1104. Else, terminate the execution flow.

Step 1104: Select a command group from an unfinished plurality of command groups.

Step 1106: Perform cache hit detection on the picked command group. When a cache hit is detected, go to Step 1108. Else, go to Step 1110.

Step 1108: Swap the buffer having cache hit with the selected command group.

Step 1110: Assign a new buffer for the selected command group.

Step 1112: Fetch the first command of the selected command group.

Step 1114: Execute the fetched command, and delete said fetched command from the selected command group.

Step 1116: Check whether there are unexecuted commands in the selected command group. When there are still unexecuted commands in the selected command group, go to Step 1112. Else, go to Step 1118.

Step 1118: Delete the selected command group, and go to Step 1102.

Figure 7:
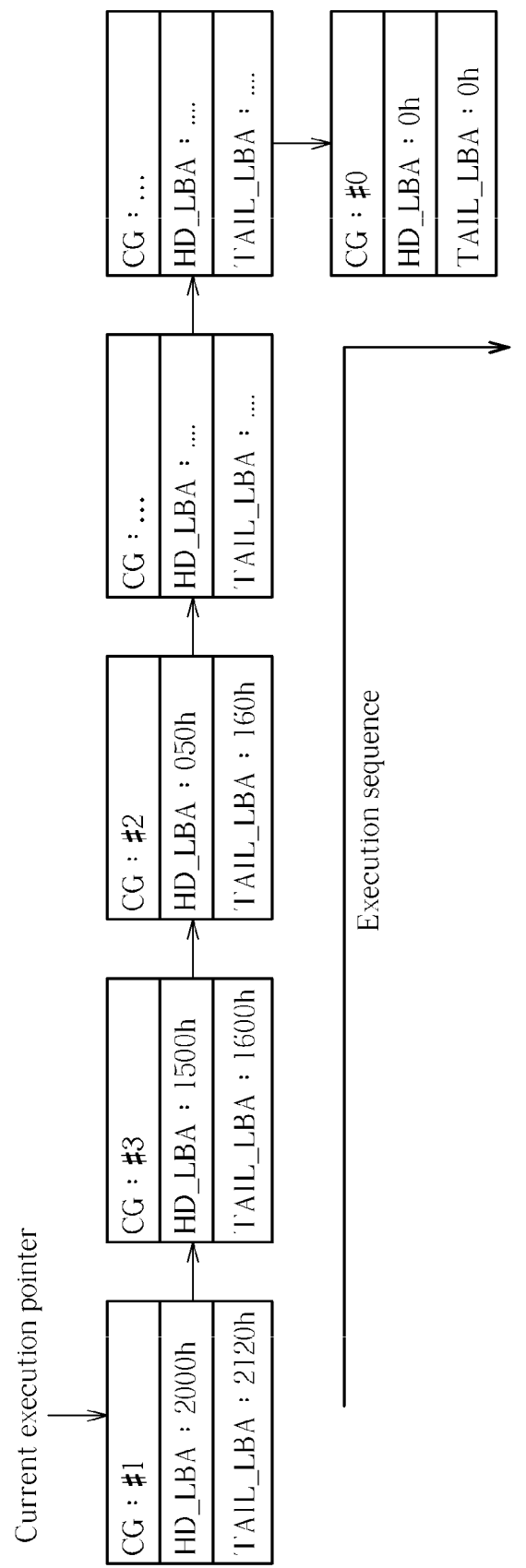
FIG. 7 is a diagram for implementing a command group queue according to a preferred embodiment of the present invention.

In Step 1104, the method of picking a command group from the unfinished plurality of command groups simply follows the current execution pointer of the command group queue utilized in FIG. 7 when the command group queue is implemented, or may also be implemented in other manners, which are described later.

In Step 1106, cache detection is performed on the selected command group for detecting whether a buffer occupied by said selected command group has a cache hit, which indicates the buffer has been written with data by other previous executed command groups, where the data meets requirements of said selected command group in write dependency. It indicates a fact that there is no need for additional seeks or reads to access data buffered at where the current execution flow does not aim at, and said current execution flow may directly operate on physical addresses where the cache hit happens, i.e., where said current execution flows aims at.

In Step 1108, since a cache hit is detected at a certain block of physical addresses on the memory, a swap of buffered data at the certain block of physical addresses has to be performed since the buffered data may be reused by other command groups later and is likely destroyed after the selected command group is executed, especially when said selected command group is a write command group. The buffered data includes various buffer counters, which are restored or reset when the swap of said buffered data is performed. Moreover, for restoring the buffered data during swaps relating to the selected command group are performed, a virtual ring buffer may be prepared in advance right after Step 1104 is executed, and is cleared right before the selected command group is deleted.

In Step 1110, when a cache hit is not detected, i.e., when a cache miss happens, a new buffer for the selected command group has to be provided first for executing said picked command group. Providing the new buffer for the selected command group includes saving current buffer counters of said selected command group, allocating a new buffer on the memory for said selected command group, and setting related pointers of said selected command group to address the allocated buffer.

Step 1112, Step 1114, and Step 1116 describe a recursive procedure of recursively executing all commands of the selected command group from the first to the last. Note that in Step 1114, before the executed command is deleted, the head pointer of the selected command group should be switched to the address of a command addressed by a next pointer of the to-be-deleted command in advance so that the addressed command becomes a next first command to be fetched in the next recursion of Step 1112.

In Step 1118, before the selected command group is deleted, local data merely related to the selected command group, i.e., not for global data relating to unfinished command groups, or buffer counters related to the selected command group and buffered in various buffers should be deleted for freeing memory in advance.

As mentioned above, determining which command group is selected first acts critically in the method of enhancing read and write performances of a disc drive. The command group queue is a useful tool for implementing such decisions, as long as next pointers of the headers in the command group queue are well followed. Except for determining the execution sequence according to the rule similar with the equation (1) and discussed in FIG. 6, there are still other criteria provided in the present invention for determining priorities of executing command groups.

Write dependency is a most critical criterion to be strictly followed. When write dependency is violated, data hazards including write hazards and read hazards are generated so that data may be read or written at bad timings and leads to a huge inaccuracy of both input data and output data. For preserving write dependency, reading before writing is a first criterion preferably applied in embodiments of the present invention, whereas writing along with verifying is preferably a second criterion applied in embodiments of the present invention.

In the first criterion of abiding by reading before writing, when the selected command group is a write command group, and when there are still some unfinished read command groups having the same physical addresses as the selected command group, the unfinished read command groups must be executed and completed before executing the selected command group. Moreover, when the selected command group is a write command group, and when there are not unfinished read command groups having the same physical addresses with the selected command group, all previous buffered data, i.e., cache, at the same physical addresses have to be deleted before executing the selected command group.

In the second criterion of abiding by writing along with verifying, a new cache buffer should be allocated for the selected command group for store buffered data while verifying, for preventing correct data from entirely disappearing because of verifying.

Figure 10:
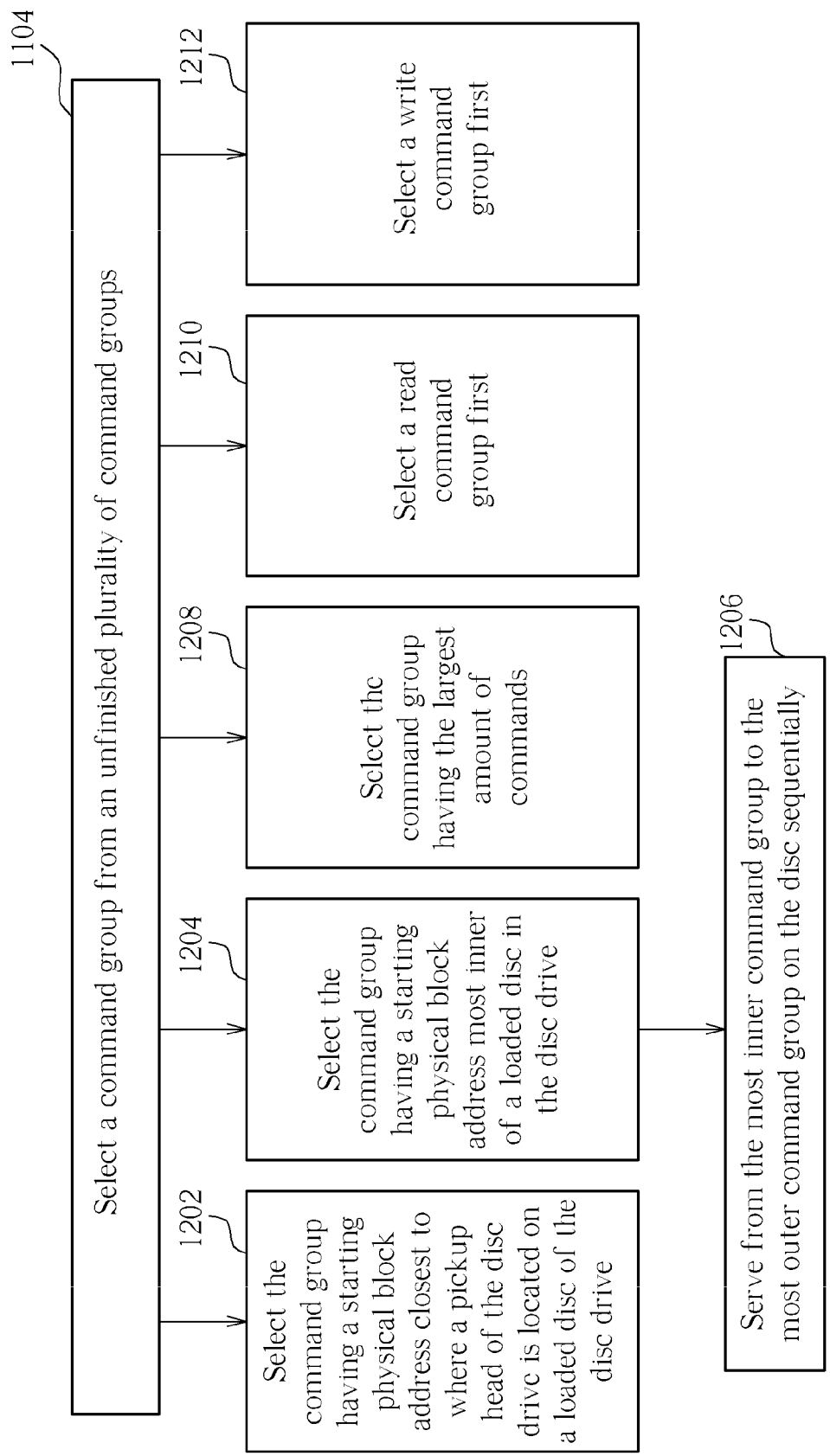
FIG. 10 is a diagram illustrating greedy strategies of picking a command group to execute in an embodiment of the present invention.

Except for both the abovementioned criteria, there are still other greedy strategies provided in embodiments of the present invention for selecting a command group to execute. Please refer to FIG. 10, which is a diagram of illustrating greedy strategies of selecting a command group to execute in the present invention, i.e., greedy strategies of performing Step 1104 shown in FIG. 9. As illustrated in FIG. 10, the greedy strategies of performing Step 1104 are listed as follows:

Step 1202: Select the command group having a starting physical block address closest to where a pickup head of the disc drive is located on a loaded disc of disc drive.

Step 1204: Select the command group having a starting physical block address most inner of a loaded disc in the disc drive.

Step 1206: Serve from the most inner command group to the most outer command group on the disc sequentially.

Step 1208: Select the command group having a largest amount of commands.

Step 1210: Select a read command group first.

Step 1212: Select a write command group first.

In Step 1202, a command group having a starting physical block address closest to where a pickup head of the disc drive is located on a loaded disc of disc drive indicates said command group requires a shortest seek distance, and a fastest response time is thus earned.

In both steps Step 1204 and Step 1206, sequential seeks having a starting physical block address most inner of a loaded disc in the disc drive are utilized for standardizing seek times for each command group so that power consumption and noises of the disc drive are reduced correspondingly, and ensure each command group is executed within a sequential seek, in price of a longer response time for each command. The strategy utilized in Step 1204 and Step 1206 prevents starvation from happening in executing command groups.

In Step 1208, a command group having a largest amount of commands is selected. Keeping on serving the heaviest command group ensures the disc drive a largest throughput of executed commands in one seek. However, some lighter command groups may thus be starved.

In Step 1210, a read command group is selected earlier than a write command group, whereas in Step 1212, a write command group is selected earlier than a read command group. Taking Step 1210 or Step 1212 depends on which type of commands the disc drive primarily executes. Taking Step 1210 for a disc drive primarily executing read commands, such as a disc player, benefits much in write dependency, and similarly, taking Step 1212 for a disc drive primarily executes write commands, such as a disc burner, benefits much in write dependency also.

As the abovementioned strategies go, starvation of command groups with different degrees arises since there are always command groups having lower priorities with a longer period. For relieving starvation resulted from strategies shown in FIG. 10, four techniques are further provided in the present invention.

A first technique for relieving starvation in an embodiment of the present invention is to provide a time counter to record an idle time of each generated command group. The time counter is utilized for recording the duration of a command group execution being postponed. With the aid of the time counter, a command group having a longest idle time is picked to be served first, and therefore, any command group is not postponed over a timeout so that starvation is prevented. Note that the timeout is set according to various requirements or operating systems.

A second technique for relieving starvation in an embodiment of the present invention is to attach a set of priority bits to each command group. In a preferred embodiment of the present invention, a larger value indicated by a set of priority bits of a command group indicates a higher priority of the command group, and the value indicated by the set of priority bits is decreased when the command group is executed, is increased when the command group continuously waits for being executed or other postponing conditions, or is reset to lowest priority when commands of the command group are all executed.

A third technique for relieving starvation in an embodiment of the present invention is to provide an executed counter for each command group, where the executed counter is utilized for recording an execution time of a command group since it may take too long to completely execute commands of a command group. Therefore, in this embodiment, an amount of commands in a currently-executing command group is checked to determine whether the amount exceeds a first predetermined amount of commands after executing a second predetermined amount of commands of the currently-executing command group, and swapping the execution flow from the current-executed command group to another command group having a largest amount of commands among the plurality of command groups except for said currently-executed command group. Once a predetermined number of commands with a group or a predetermined time period equals the executed counter, the command group may give up the right of the execution flow at least temporarily. In a preferred embodiment of the present invention, a higher count stored in an executed counter of a command group, lower priority the command group has.

A fourth technique for relieving starvation in an embodiment of the present invention is to always pick a command group having a smallest execution time first. This strategy ensures that a maximum number of command groups will be executed within a smallest amount of time.

In the strategy of Step 1208 described in FIG. 10, a command group having a largest amount of commands is always the first to be selected and executed. However, after some commands of selected command group are served, if the selected command group remains the command group having the largest amount of commands among all the command groups, it may indicates a fact that there are still commands being inserted into the selected command group during the execution of commands, and therefore, some lighter command groups may not be picked and executed for a longer period of time and thus starved.

Figure 11:
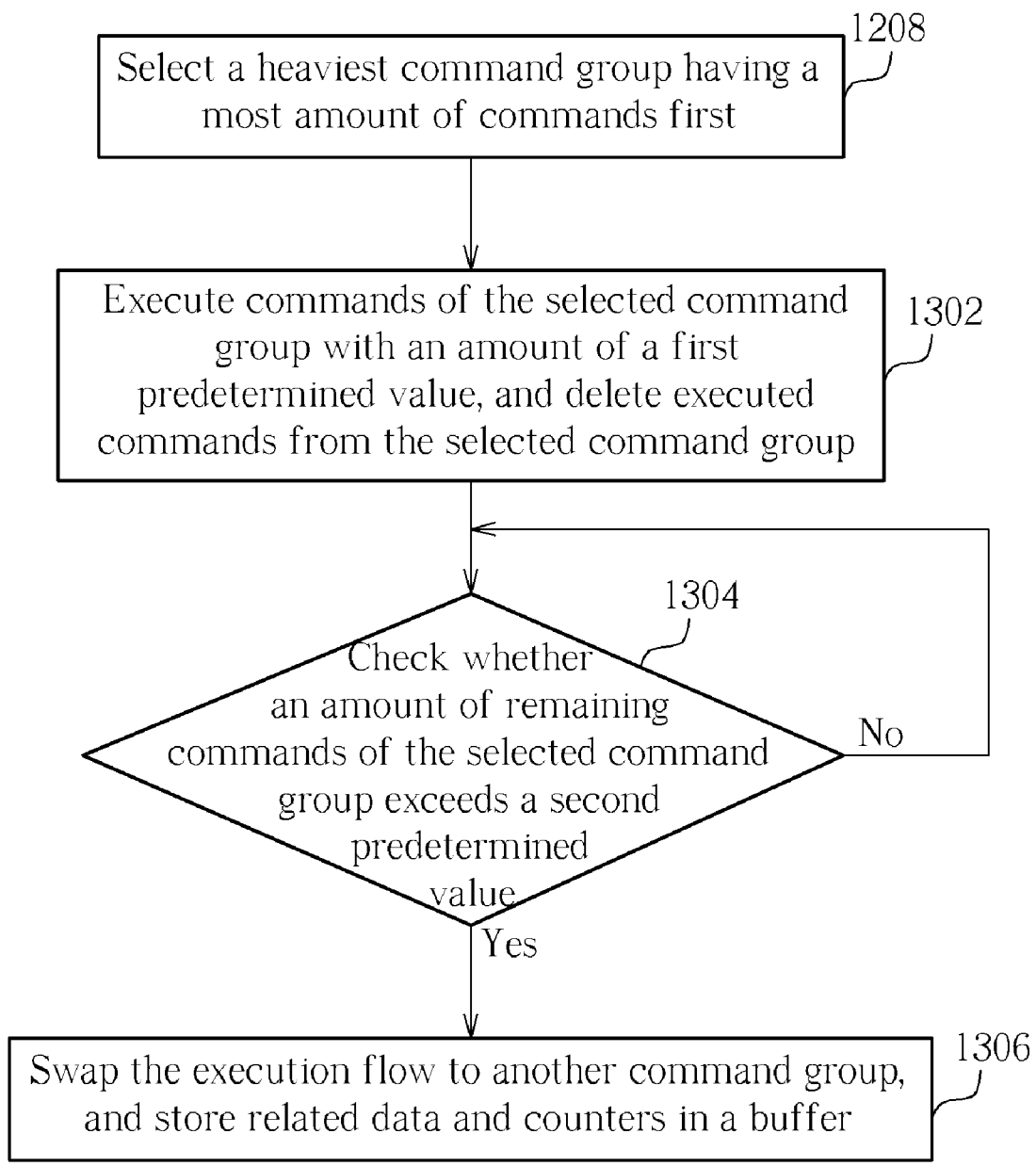
FIG. 11 is an enhanced flowchart illustrating the solution for relieving starvation caused by the strategy of picking the heaviest command group first.

Please refer to FIG. 11, which is an enhanced flowchart of illustrating the solution for relieving starvation caused by the strategy of picking the heaviest command group first illustrated in Step 1208 shown in FIG. 10. Except for Step 1208, attached steps shown in FIG. 11 are listed as follows:

Step 1302: Execute a predetermined amount of commands of the selected command group, and delete the executed commands from the selected command group.

Step 1304: Check whether an amount of remaining commands of the selected command group exceeds a second predetermined value. When the amount of remaining commands of the selected command group exceeds the second predetermined value, go to Step 1306. Else, go to Step 1302 again.

Step 1306: Swap the execution flow to another command group, and store related data and counters in a buffer.

For preventing continuously serving a command group having the largest amount of commands for a long period of time or is continuously being inserted with new commands, in Step 1302, the number of executed commands of each picked command group is limited each time when a command group is selected. The first predetermined value may be a positive integer, and is determined according to various requirements or operating systems. Then in Step 1304, a remaining amount of commands of the selected command group is checked for determining whether the selected command group still has the largest amount of commands after being served with the limited amount of commands. The second predetermined value is served as a standard for determining whether a command group still has the largest amount of commands, and it indicates a fact that when an amount of commands of a command group exceeds the second predetermined value, the command group is regarded as a command group still having the largest amount of commands. The second predetermined value is determined according to various requirements or operating systems.

In Step 1306, when the selected command group still has the largest amount of commands after executing commands of an amount of the first predetermined value, the selected command group is get rid of the execution flow for swapping said execution flow to other command groups having a large amount of commands, and waits for a next time when said selected command group retrieves the execution flow again. When the execution flow swaps from the selected command group, counters and data relating to the selected command group have to be stored in a buffer first for preparing for the next time when the selected command group is executed. When the selected command group no longer has the largest amount of commands after being served with commands of an amount of the first predetermined value, it indicates a fact that the selected command group is going to be finished soon, and the execution flow is kept on the selected command group for preserving the integrity of operations related to the selected command group.

Figure 12:
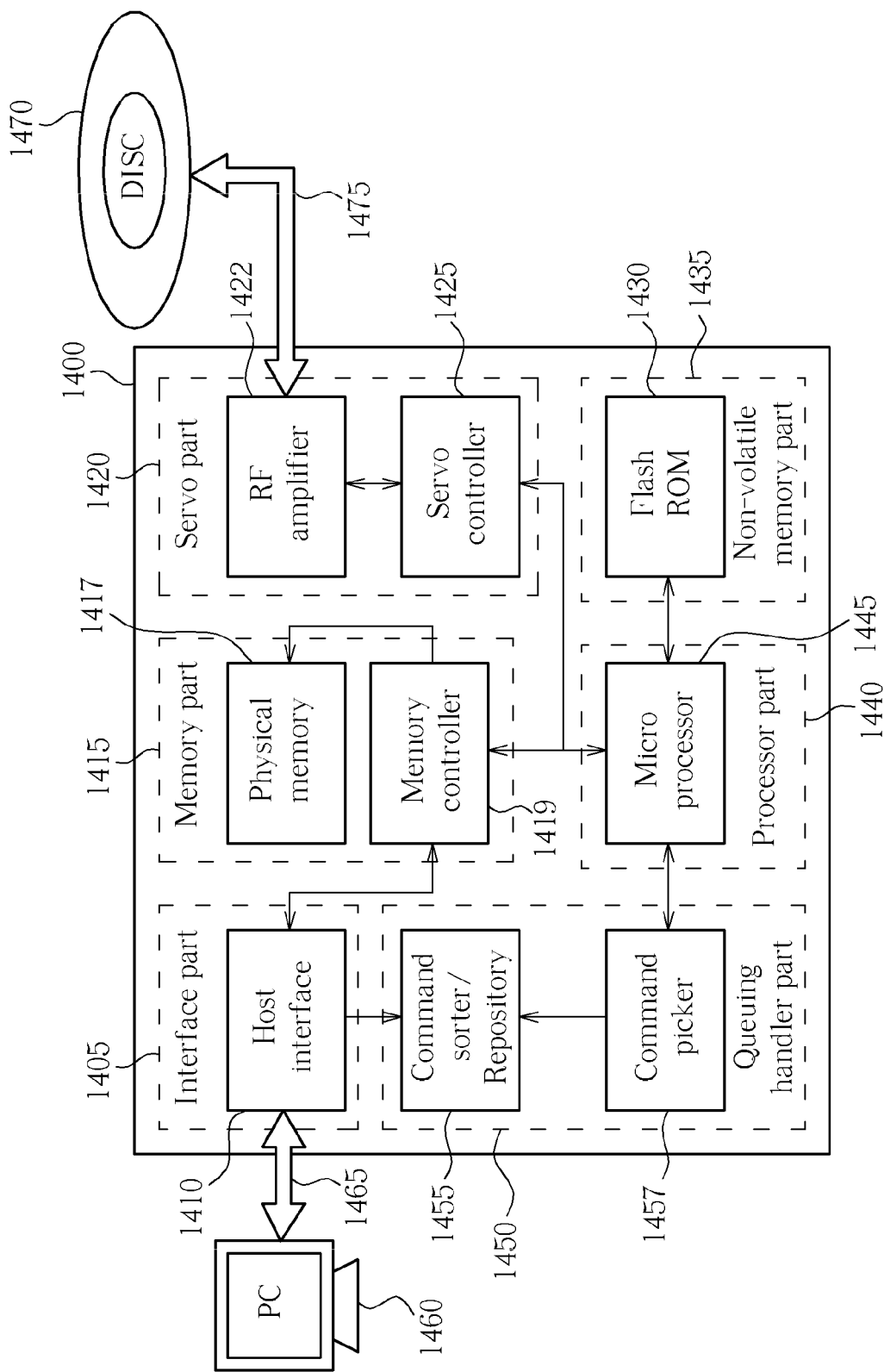
FIG. 12 is a block diagram of an optical disc drive according to a preferred embodiment of the present invention.

Please refer to FIG. 12, which is a block diagram of an optical disc drive 1400 according to a preferred embodiment of the present invention. Optical disc drive 1400 comprises an interface part 1405, a memory part 1415, a servo part 1420, a non-volatile memory part 1435, a processor part 1440, and a queue handling part 1450.

The Interface part 1405 may comprise a host interface 1410 for facilitating all communications between a host computer 1460 and the optical disc drive 1400 via a communication interface 1465. The memory part 1415 may comprise a volatile physical memory 1417 coupled to a memory controller 1419, which may in turn also be coupled to the host interface 1410 for transferring data and commands to and from the host computer 1460. The servo part 1420 serves to effect communications between the optical disc drive 1400 and a loaded optical disc 1470 via a communications bus 1475. The servo part 1420 may comprise an RF amplifier 1422 connected to the communications bus 1475 for amplifying signals read from the optical disc 1470. A servo controller 1425 may be coupled to the RF amplifier 1422 for controlling the optical pickup head (not shown) to read and/or write the optical disc 1470.

The processor part 1440 may comprise a micro processor 1445 for controlling operations of the optical disc drive 1400. This control may include accessing and executing programs stored in a FLASH ROM 1430 of the non-volatile part 1435, controlling the servo controller 1425 and the memory controller 1419, and control of the queue handling part 1450 of the optical disc drive 1400, all three to which the micro processor preferably is coupled. The queue handling part 1450 is also coupled to receive input via the host interface 1410. Portions of the queue handling part 1450 may be software, firmware, or hardware according to design considerations.

The queue handling part 1450 is of particular interest in some embodiments and may comprise a command sorter/repository 1455 and a command picker 1457.

The command sorter/repository 1455 may be responsible for reception, sorting, and storage of commands received from the host interface 1410. The exact sorting functions of the command sorter/repository 1455 comply with needs of the various embodiments but include sorting commands into groups of commands according to command type and/or distance and/or another method previously described to enhance command executing performance of the disc drive. The command groups are preferably placed into a linked list and commands within the linked list may be rearranged and placed into a command queue as previously described to further enhance performance. Newly received commands may be inserted into command groups when appropriate and some embodiments may additionally include merging and/or splitting of groups in the interest of drive efficiency.

The command picker 1457 is coupled to both the micro processor 1445 and the command sorter/repository 1455 and provides the functions of selecting as described above which of the command groups formed by the command sorter/repository 1455 should be executed, and provides the selected command group to the micro processor 1445 for execution.

In the present invention, a method of enhancing command executing performance of a disc drive is provided. First, a data structure for implementing a command is provided, and a command group having a plurality of commands is established according to the provided data structure. With basic grouping criteria, commands of a command group are well grouped and linked; therefore a command group may basically be a linked list. With the aid of command groups, commands within the command groups may be rearranged and specific command groups may be selected to enhance command executing performance. A new command may be easily inserted into a matching command group, and related management of commands is enhanced by preventing commands from intermixing and by decreasing unnecessary seeks. Though starvation may happen with the use of the command groups, a few starvation prevent methods are also provided in the present invention, and therefore, starvation is relieved along with the amount of seeks. And the defect of low command executing performance caused by unnecessary seeks is thus solved with the aid of the method of the present invention since commands are well grouped and classified, i.e., read command groups and write command groups.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical disc drive comprising:
    a command sorter/repository for creating at least one command group according to a plurality of commands, allocating the commands into the at least one command group, rearranging a command executing sequence of commands in each command group, and queuing the at least one command group, wherein the command sorter/repository further is for allocating the commands having physical block addresses within a predetermined distance of each other into one of the command groups;
    a command picker coupled to the command sorter/repository for selecting a command group from the at least one queued command group; and
    a micro processor coupled to the command picker for executing commands in the selected command group according to the command executing sequence of the selected command group.

2. The optical disc drive of claim 1, wherein the command sorter/repository further is for allocating the plurality of commands according to a command type and/or a logical block address of each command.

3. The optical disc drive of claim 1, wherein the command sorter/repository further is for allocating the commands having the same command type together into one of the command groups.

4. The optical disc drive of claim 1, wherein the command sorter/repository further is for selecting the command group having a starting physical block address closest to where a pickup head of the disc drive is located on a loaded disc of disc drive.

5. The optical disc drive of claim 1, wherein the command sorter/repository further is for selecting the command group having a starting physical block address most inner of a loaded disc in the disc drive.

6. The optical disc drive of claim 1, wherein the command sorter/repository further is for selecting the command group having a largest amount of commands.

7. A method of enhancing command executing performance of a disc drive, comprising:
    collecting a plurality of commands;
    creating at least one command group according to the commands;
    allocating the commands into the at least one command group, wherein the commands having physical block addresses within a predetermined distance of each other are allocated into one of the command groups;
    queuing the at least one command group;
    arranging a command executing sequence of commands in each command group;
    selecting a command group from the at least one queued command group; and
    executing commands in the selected command group according to the command executing sequence of the selected command group.

8. The method of claim 7, wherein the allocating step allocates the plurality of commands according to a command type and/or a logical block address of each command.

9. The method of claim 8, further comprising the following step:
    allocating the commands having the same command type together into one of the command groups.

10. The method of claim 7, wherein the selecting step comprises the following step:
    selecting the command group having a starting physical block address closest to where a pickup head of the disc drive is located on a loaded disc of disc drive.

11. The method of claim 7, wherein the selecting step further comprises the following step:
    selecting the command group having a starting physical block address most inner of a loaded disc in the disc drive.

12. The method of claim 7, wherein the selecting step further comprises the following step:
    selecting the command group having a largest amount of commands.

13. The method of claim 7, wherein the selecting step further comprises the following step:
    selecting a group according to the type of commands in the command group.

14. The method of claim 7, wherein the received commands are stored within a data structure, the data structure comprising:
    a command identity of the command;
    a flag for indicating the command type of the command;
    a logical block address for indicating a starting physical block address for executing the command;

an execution length of the command;
a priority of the command; and
a next pointer for addressing a next command.

15. The method of claim 14, further comprising the following steps:
generating a header for each of the at least one queued command groups;
generating a head pointer for each of the generated headers to address the first command of a corresponding command group;
generating a tail pointer for each of the generated headers to address the last command of a corresponding command group;
assigning a priority for each command in a command group from the first command to the last command; and
allocating a memory segment in a physical memory on the disc drive for each of the command groups as a buffer according to target physical addresses of commands in each of the command groups, the target physical addresses locating on the physical memory.

16. The method of claim 7, further comprising:
collecting a new command into one of the command groups.

17. The method of claim 16, further comprising:
checking whether any command group matching the new command exists, wherein a tail address of the last command of said matching command group plus a predetermined length reaches a physical block address of said new command, and a flag of said new command is consistent with the matching command group; and
setting a next pointer of the last command of the matching command group to address the new command when the command group matching the new command exists, and setting a tail pointer of the matching command group to address the new command.

18. The method of claim 17, further comprising:
creating a command group for the new command when a matching command group of the new command does not exist; and
setting both a head pointer and a tail pointer of a header of the created command group to address the new command.

19. The method of claim 7, further comprising:
providing a time counter to record an idle time of each of said generated plurality of command groups; and
picking a command group having a longest idle time first.

20. The method of claim 7, further comprising:
picking a command group having a smallest execution time first.

21. The method of claim 7, further comprising:
checking whether an amount of commands in a currently-executing command group exceeds a first predetermined amount of commands after executing a second predetermined amount of commands of the currently-executing command group; and
swapping the execution flow from the current-executed command group to another command group having a largest amount of commands among the plurality of command groups except for said currently-executed command group.

* * * * *